Figure 8:
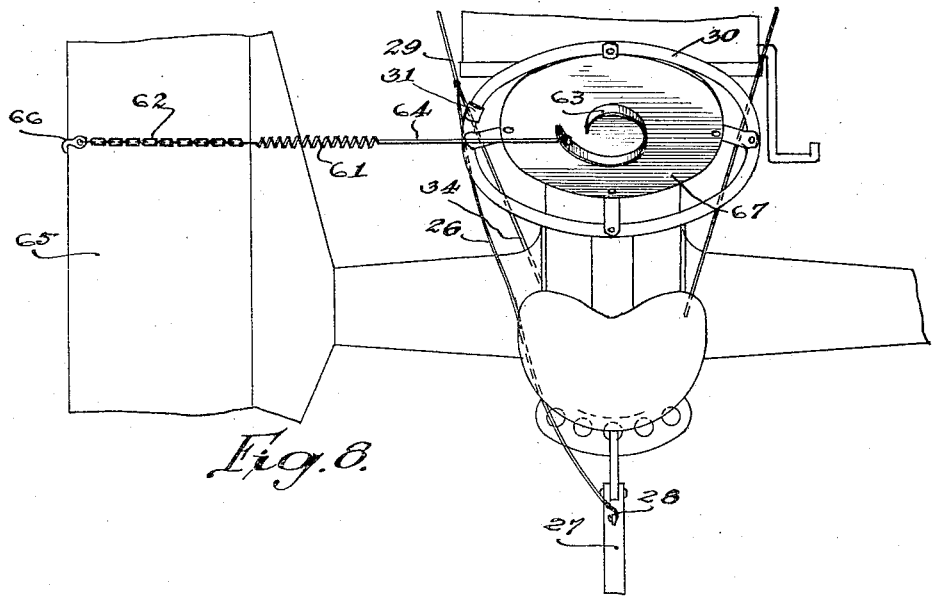

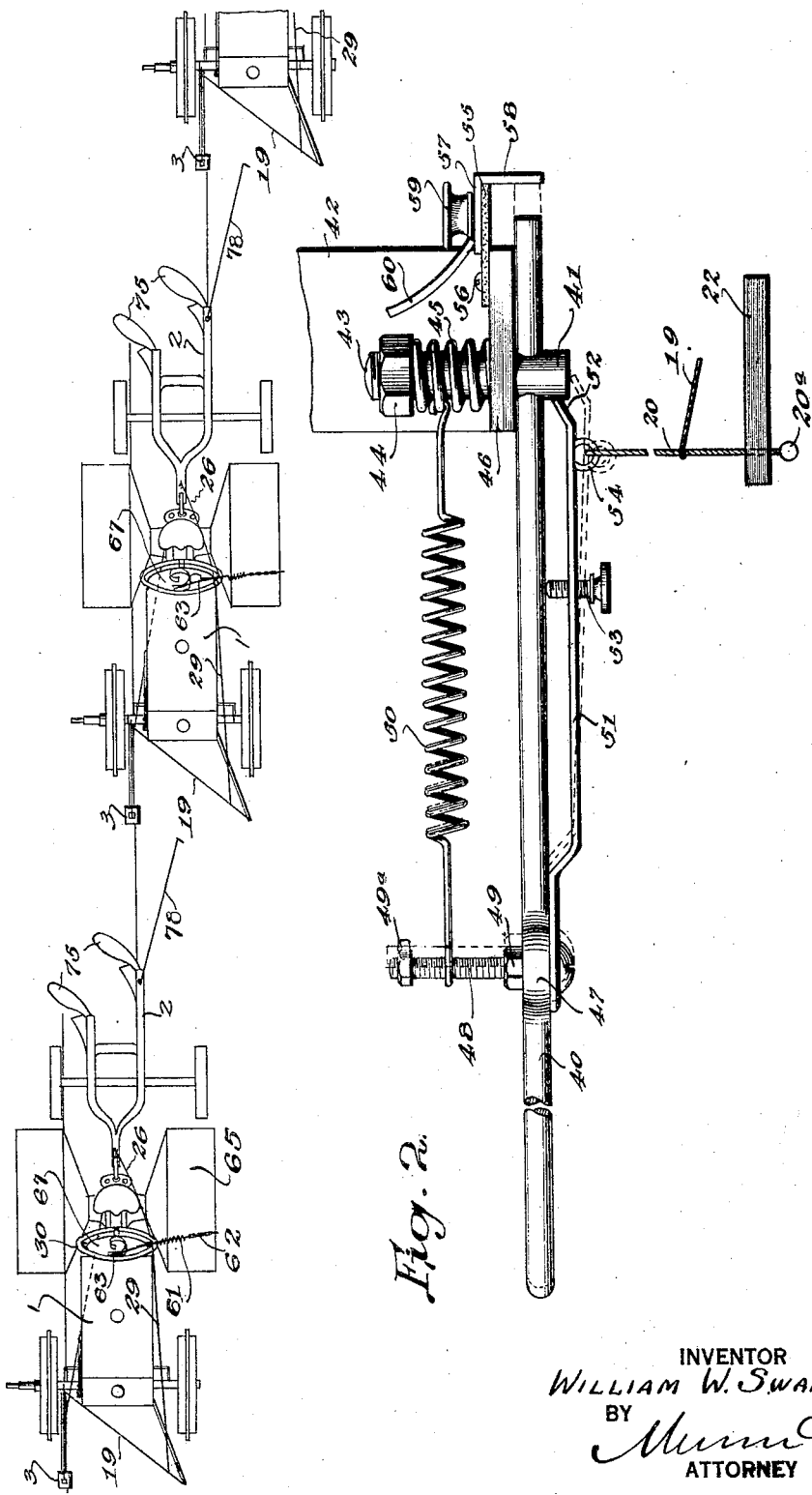

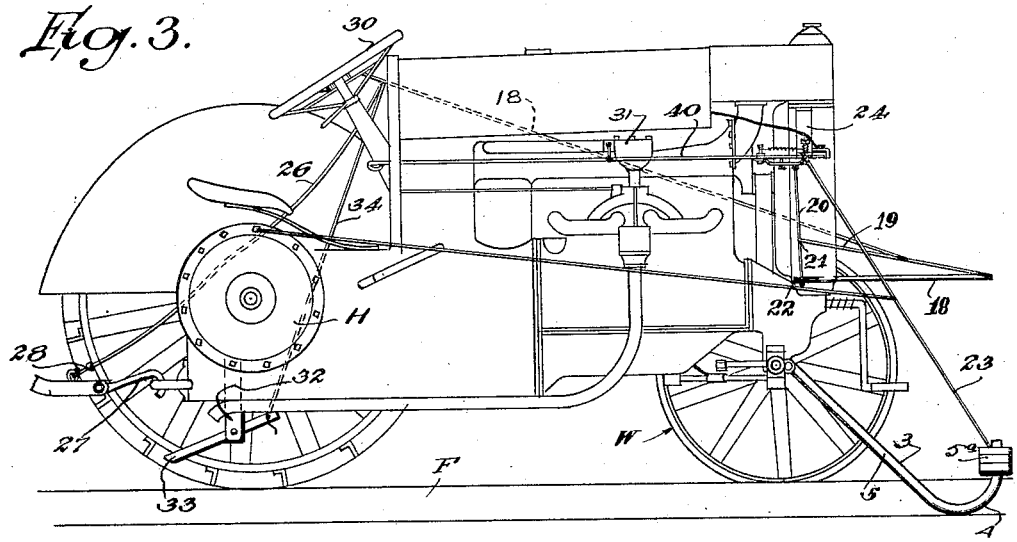
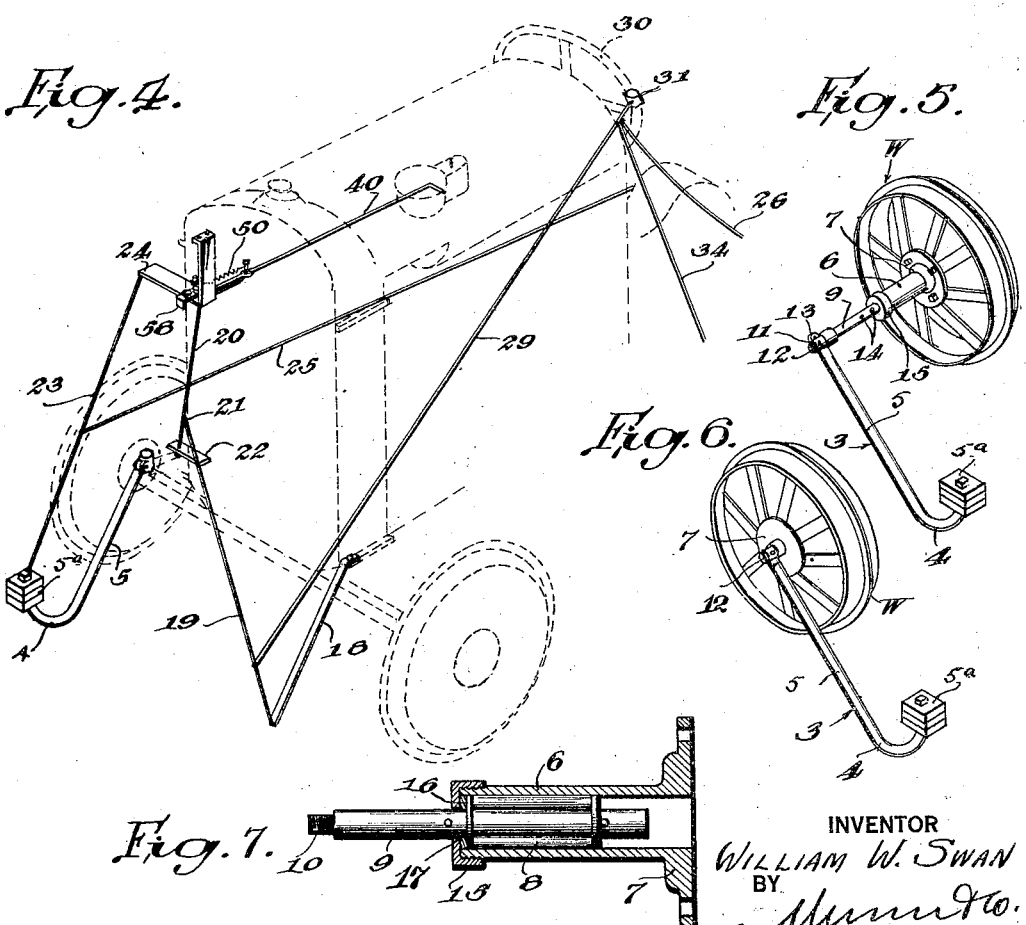

Dec. 6, 1932.   W. W. SWAN   1,889,906
STEERING GEAR FOR TRACTORS
Filed Nov. 17, 1927   3 Sheets-Sheet 3

INVENTOR
WILLIAM W. SWAN
BY
ATTORNEY

Patented Dec. 6, 1932

1,889,906

UNITED STATES PATENT OFFICE

WILLIAM W. SWAN, OF FRANKFORT, SOUTH DAKOTA

STEERING GEAR FOR TRACTORS

Application filed November 17, 1927. Serial No. 233,849.

This invention relates to an automatic driverless plowing outfit and more particularly to steering and stopping mechanism for tractors, used in plowing.

It is well known, of course, that a tractor operated plowing outfit which can be run without a driver can be operated with much greater economy and in that connection the invention has in view the construction of automatic mechanical steering mechanism whereby a tractor used in plowing may operate without a driver, and which controls the course of the tractor and prevents all possibility of it and the plow leaving the furrow and running wild.

Having in view such equipment of a tractor, one of the primary objects of the invention is to provide mechanism of this character which plows and operates perfectly without manual assistance, the only attention required being the renewal of fuel, oil and water, at intervals of from three to eight hours, adapting the tractor plowing outfit to be run steadily for indefinite periods.

Another object is to so construct such mechanism that the motor will automatically stop should the plow clog sufficiently to stall the tractor; or should the guide bar for any reason leave the furrow; or upon the shearing loose of the tractor from the plow incident to the striking of an obstruction by the plow.

Still another object is to so construct such steering mechanism that a plurality of plowing outfits equipped with the mechanism constituting this invention may be simultaneously used, one in rear of the other, without danger of collision, should one outfit for any reason stop.

Another object is to so construct such steering mechanism that the motor may be automatically stopped by choking the primer or by cutting off the ignition, or the ignition cut-off may be operated to stop the motor without choking the primer, and vice versa, or they both may be operated together, if desired.

In carrying out these objects the invention is susceptible of a wide range of modification without departing from the spirit or sacrificing any of the advantages of the claimed invention; there being shown in the drawings for illustrative purposes, a preferred and practical form, in which;

Figure 1 represents a plan view of a plurality of plowing outfits equipped with this invention, shown arranged one behind the other for plowing a number of furrows simultaneously, Fig. 2 is a side elevation, with parts broken out, of the automatic stopping mechanism, Fig. 3 is a side elevation of a tractor equipped with the invention, Fig. 4 is a perspective view showing the control cables mounted upon the tractor, the latter being indicated by dotted lines.

Figure 9:
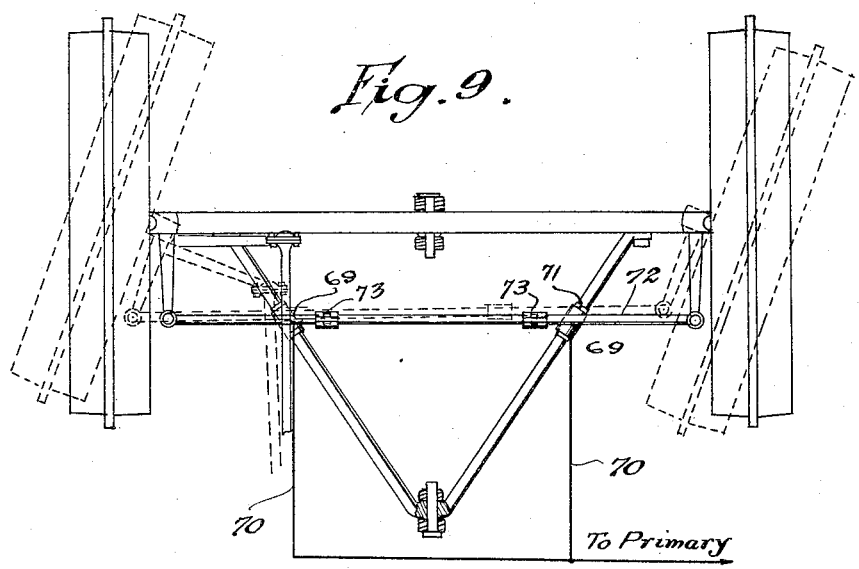
Figure 10:
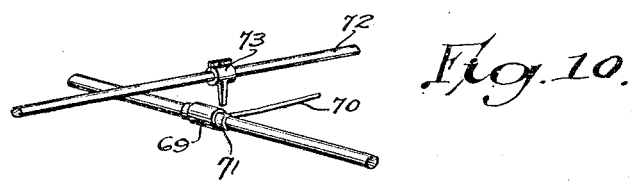

Fig. 5 is a detail perspective view of the tractor guiding bar, and the extension hub used in connection therewith, Fig. 6 is a similar view of a different manner of mounting such bar, Fig. 7 is a sectional view partly in elevation of the extension hub and its cooperating parts, Fig. 8 is a top plan view of a portion of a tractor showing the connection of the cables with the steering wheel, Fig. 9 is a plan view of the steering gear showing a spring stop for adjustable ignition grounding contact, and, Fig. 10 is a detail perspective view of the contact.

Like reference characters designate corresponding parts throughout the several figures of the drawings.

This invention contemplates in the construction of such a steering mechanism the provision of a tractor 1 which may be of any conventional type, with a plow 2 attached in any usual manner. One of the distinctive features of the invention is a furrow guiding shoe so connected with the steering spindle of the tractor that turning motion will be transmitted to the front wheels of the tractor by contact of the shoe with the wall of an engaged furrow, an important essential being that there must always be uniform pressure between the furrow wall and the guide shoe or bar in every position whether the furrow be straight or curved.

This shoe 3 is substantially J-shaped in form, and is preferably composed of two sections to adapt it to be taken apart and stored in a small space when desired. As shown, one of the sections 4 and 5 has a reduced threaded extension and the other a threaded socket to receive said extension. The hook-shaped end of the section 4 which is designed to ride on the bottom of the furrow F, as shown in Fig. 3 is provided on its free upturned end with a plurality of removable weights $5^a$ which are designed to exert the necessary pressure on the shoe to cause it to properly engage in travel on the furrow bottom. These weights, of course, may be removed, according to the tension it is desired to be exerted on the shoe.

This shoe is designed to be mounted adjacent the outer face of one of the front wheels on the front axle.

When the two side wheels W, W' are designed to run on the ground outside the furrow F as shown in Fig. 3, an extension axle, or rather an extension hub 6 is provided, and is attached to the front wheel by means of a plate 7 which is used in place of the usual hub cap and is flanged and secured to the wheel by the same bolts which secure the hub cap, it being of course understood that the hub cap is removed when this extension axle is used and this hub 6 substituted. This extension hub 6 is hollow as shown clearly in Fig. 7 and is provided with a roller bearing in which is mounted a shaft 9 provided at its outer end with a reduced threaded extension 10 to receive a slotted nut or sleeve 11 in which is mounted the guide shoe 3, the upper end of the section 5 being flattened and inserted in the slot of the sleeve 11 where it is held by a pin 12 which passes through the split end of the sleeve and through an aperture formed in the shoe arm. This shoe arm also has another aperture 13 designed for a purpose hereinafter to be described.

The shaft 9 is also provided with a plurality of pin holes 14 to provide for its longitudinal adjustment relative to the hub.

A screw cap 15 is threaded on the hub 6 and operates to hold the roller bearing in position, said bearing being seated against an internal shoulder 16 and a felt ring or packing 17 provided to retain the grease and to exclude the dust. It will be seen that the shaft 9 being adjustable within the hub 6, the shoe may be positioned any desired distance from the wheel W so that these wheels may travel varying distances from the furrow F in which the shoe 3 is travelling.

When it is desired to run the two side wheels W, W' of the tractor in the furrow F, the nut or sleeve 12 is removed from the shaft 9 said shaft and the extension hub removed and the sleeve 12 screwed on the spindle arm of the axle in place of the usual nut. The flattened end of the shoe 3 is then pivoted in the split end of the sleeve by means of the hole 13 which permits rotation of the shoe in the slot. It is understood that the whole structure must be mounted and shouldered up tightly so that the shoe 3 will rotate in a vertical plane with the curved end upward.

On the side of the tractor opposite to that which carries the shoe 3 and secured to the chassis of the tractor is a supporting bar 18. This bar is rigidly secured to the chassis and extends forwardly and obliquely with respect to the plane of the tractor as is shown clearly in Fig. 4. A cable 19 of suitable material is attached at one end to the free end of the bar 18 and extends across the front portion of the tractor and is connected to a cable 20 as shown at 21. The cable 20 is attached at one end to a bracket 22 suitably mounted on the tractor frame and at its other end is secured to a priming rod 40 of a carburetor, not shown. A cable 23 connects the free end of the guide shoe 3 with a bracket 24 suitably mounted on the tractor, so that the point of connection is in line with the axis of the spindle pin. Attached at one end to the cable 23 a suitable distance from the bracket 24, is a guide shoe elevating cable 25. The other end of cable 25 is connected to a suitable part of the tractor convenient to the driver's seat. It is obvious a slight pull or pressure on cable 25 elevates the curved end of the guide shoe 3.

A cable 29 connects the cable 19 at a point spaced slightly from the bar 18 as shown in Fig. 4 with the steering wheel 30. The connection with the wheel 30 is made by means of a clamp 31 mounted on the rim of the wheel 30 as is shown clearly in Fig. 4.

Secured to the differential housing H is a depending bracket 32 upon which is pivotally mounted a ground engaging member 33. A cable 34 is attached at one end to the upper or inner end of the lever 33 and at its other end is connected with the cable 29 adjacent the steering wheel connection thereof, as is shown clearly in Figs. 3 and 4.

It will thus be seen that should the tractor stall the drive wheels will slip and turn without moving the tractor thereby causing them to dig or grind down into the ground thereby causing the rear axle to contact with the ground. When this occurs the member 33, which normally clears the ground, will contact with the ground and the lower end thereof will be swung upwardly and the upper end downwardly changing the position of the member 33 from oblique to horizontal, thereby exerting a pull on the cable 34 and the pull so exerted will be transmitted through cables 29, 19 and 20 to the motor cut-off mechanism, which latter will be presently more fully described. It will be obvious that the stopping of the motor will also stop the digging in of the wheels.

The motor cut-off which constitutes an essential feature of the invention is shown on a large scale in Fig. 2, and is shown in connection with the carburetor priming rod 40 which is slidably mounted in a stud 41 carried by a mounting plate 42 suitably secured to the engine frame. This stud 41 has a threaded end 43 to receive a nut 44 between which and the bracket 46 in which said stud is mounted is located a coiled spring 45.

The priming rod 40 is provided intermediate its end with an eye to receive a screw 48 which is held engaged with the rod by a lock nut 49, another nut 49ª being preferably mounted on the outer end of the screw to form a stop to prevent the slipping off therefrom of one end of a tension spring 50 which is connected at its other end with the coiled spring 45 on the stud 41. This tension spring 50 is designed for closing the priming valve and also to ground the ignition circuit when a slight pull or exertion of the trip line 20 occurs, which releases the stud 41 from its engagement by a lock lever 51. This lever 51 has its rear end offset inwardly and mounted on the screw 48 between the head thereof and the priming rod as is shown clearly in Fig. 2. The front end of the lever is bent inwardly at an oblique angle, as shown at 52, and is designed to normally engage the stud 41 and hold the rod in projected position against the tension of the spring 50, and by means of which the priming valve, not shown, is held open. The stop lever 51 is preferably constructed of resilient metal and is provided intermediate its length with a set screw 53 which operates through the lever and adjacent the rod 40 and is designed to adjust the position of the lever 51 in relation to the rod 40. It will be seen that when the screw 53 is turned to move the lever 51 outward, the end 52 of said lever will be disengaged from the stud 41 as shown in dotted lines in Fig. 2, and thus permit said rod to slide in the stud 41 under the tension of the spring 50. The trip line, or cable 20 is connected with the lever 51 near its free end by means of an eyelet 54 or other suitable means. This trip line 20 extends through the bracket 22 and is provided at its end with a weight 20ª provided to afford slack for the line 20 and yet prevent its slipping out through the bracket 22. This knob or weight 20ª also operates as a grip device to facilitate manual manipulation of the lever 51 when it is desired to release said lever from the stud 41 and stop the motor.

An insulating plate 55 is mounted on the bracket 24 by a screw 56 which carries an electric terminal in the form of an angle plate 57, one leg 58 of which is located in the path of the priming rod 40, as is shown clearly in Fig. 2. Upon the other leg of the plate is secured a binding post 59 which secures to the plate 55 a conductor 60 which leads to the primary ignition circuit.

In the operation of this motor stop or cutoff mechanism, when the plow encounters an obstruction, such as a rock or the like, a pull will be exerted on the line 26 and said pull will be transmitted through the lines 29, 19 and 20 to the lever 51 and operate to pull the end 52 of said lever out of engagement with the stud 41 and permit the priming rod 40 to move forward in the stud 41 under the tension of the spring 50 and thereby close the priming valve, choking the engine and causing it to stop. At the same time the forward movement of the rod 40 will operate to engage it with the terminal 58 thereby grounding the circuit to the primary of the ignition coil and rendering the stopping of the engine doubly sure.

Referring again to the furrow guiding shoe 3 it is to be noted that the down pressure on the outer end of the shoe must always exceed the friction between the vertical wall of the furrow F and the guide shoe which pressure is, due to side pressure from the steering wheel spring 61 which is transmitted through the regular steering gear, and which will presently be more fully described. In practice, approximately twelve pound twist on the steering wheel rim 30 transmits about eight pounds side pressure while the tractor is moving to the free end of the steering bar, and where a two-plow outfit is employed, the furrow guided shoe should have at least five pounds weight or downward pressure to safely overcome friction between the furrow wall and the guide shoe, the guide shoe always remaining in the angle of the side and bottom of the furrow. This weight or downward pressure is provided by the use of the removable weights 5ª.

As shown clearly in Fig. 8 the steering wheel spring 61 which is designed to impart a side tension to the steering wheel and afford steady motion to the front steering wheels of the tractor and exert a sidewise pressure of the shoe 3 on the furrow wall, is connected preferably by a chain 62 to a fixed portion of the tractor frame, it being here shown secured to the fender 65 by means of a hook 66. The other end of the spring 61 is connected by means of a wire 64 with one end of a spiral cam 63 carried by the steering wheel 30. This cam 63 is mounted on the steering wheel 30 by means of a plate 67 here shown secured to the spider of the steering wheel.

In the use of this side tension spring 61, when the steering wheel 30 controlled by the usual steering gear of the tractor turns, the spring connector or extension 64 will wind on the cam 63, thus expanding the spring 61 and maintaining a uniform torsion on the steering wheel shaft. Ordinarily the tension of the spring 61 is twice as great as the twisting leverage of the spiral cam 63, that is the twisting leverage of the spiral cam is one-half that of the spring, it being understood that the leverage of the spiral cam decreases as the tension of the spring 61 increases and vice versa. It is, of course, understood that the tension of the spring 61 may be adjusted by shortening or lengthening the chain 62. As shown in Fig. 1, this cam is positioned for turns to the right. For plowing with left turns the cam should be revolved still another 90 degrees.

This spiral cam 63 is regarded as a vital and important feature of the invention, and it is to be noted that the tension of spring 61 varies inversely with the leverage of the cam 63.

In Figures 9 and 10, one means for grounding the ignition of the tractor is illustrated, the means shown comprising clamps 69 applied to the radius rod of a steering gear having suitable electrical connection 70 to the primary of the ignition coil. The clamps 69 which are preferably of copper are insulated from the radius rod by means of suitable insulation shown at 71.

Clamped on the steering arm 72 are adjustable contacts 73 which are positioned so as to engage with the clamps 69 at intervals. It will thus be seen that by this arrangement, the turning movement of the front wheels of the tractor can be readily adjusted so as to establish an accurate corner curve of approximately 90 degrees. In the event that for some reason the proper turn has not been made, contact is established between one of the clamps 69 and its corresponding contact 73 and thereby grounding the circuit to the ignition coil, which will stop the motor of the tractor.

In the use of this attachment, a furrow F is first formed with a driver at the steering wheel. The clamp or stop member 73 is adjusted with the arm depending vertically in making the first furrow so that the turns will be alike and of a suitable radius. It will be apparent that when the arm of the member 73 contacts the member 69, the turning radius can get no smaller and the ignition will be cut out owing to the grounding of the current. Therefore the man at the wheel must control this first furrow by holding the wheel so that the members 73 and 69 almost but not quite contact. When the first complete furrow is made entirely around the field, the clamp stop member 73 is turned so that the arm is horizontal and inoperative with regard to the grounding contact 69. The clamp stops 73 are adjustable both rotatably and longitudinally on the steering arm connecting rod 72. Either one or the other of the stops 73 is used according to the way in which the land is to be plowed from on one side or from the center. The members 73 and 69 are principally for accuracy and convenience in constructing the first furrow suitable for automatic plowing. It is obvious that the members 73 may be adjusted horizontally to be inoperative when the plowing unit is running without a driver or if desired they may be set vertically so as to provide a supplementary cutout should any unforeseen accident or breakage occur to the regular choke rod cut-off mechanism, thus providing additional safety means, and then the furrow guiding shoe 3 is disposed therein as shown clearly in Fig. 3. The machine is then ready for operation and on the starting of the motor will proceed to automatically plow without a driver, the course of the tractor and the plows connected therewith being automatically controlled, without any attention being required other than the renewal of the fuel and water at intervals.

Should any obstruction be presented either to the furrow guiding shoe 3, the plow shares shown at 75, or the ground engaging elements 33, a pull or jerk will be exerted upon the respective cable of the element encountering the obstruction, and through the cooperating cables connected therewith will be transmitted to the automatic motor cut-off, thereby closing the priming valve of the carburetor and choking the engine, as well as grounding the ignition in the manner above set forth, and effectively stopping the tractor.

Should a number of tractors be employed in plowing, as shown in Fig. 1, and for any reason should one of the units become disabled, the tractor next following would come to a predetermined distance and stop, and then the next tractor behind that would do the same, avoiding all possibility of collision. This is due to the fact that a plow carried stop wire 78 extends rearwardly in a horizontal plane from the left plow beam of each tractor, and is located in the path of the stop line 19 of the succeeding tractor, so that the engagement of said line 19 with said wire operates to exert a pull on the trip line 20 and thereby close the choke valve as well as ground the ignition system of the following tractor and cause it to stop immediately, it being of course understood that the plows which are drawn by the on-coming tractor will assist in stopping of the tractor without collision. The tractor next following will operate in the same way so that no danger of collision would occur. These stop wires 78 are preferably constructed of #8 wire about four feet long and each has its free end up-turned to facilitate its engagement with the stop line 19 of the following tractor.

As above described, the hook 28 which connects the plow beam 27 with the cable 26 is formed of metal sufficiently soft to straighten out under a predetermined tension, ordinarily about five pounds, so that the tractor would be released from the plow without breaking of the line 26 should the plow for any reason become disconnected from the tractor.

In making, say six hour runs, the required distance from the last furrow may be paced off and a pointed stick or wire placed upright so that the trip 51 will absolutely stop the outfit automatically when the stop line coming in contact with the wire pulls the trip line and releases the spring lock lever 51 from the end of the priming rod stud 52. This allows the spring 50 to instantly close the priming or choke valve by pulling the priming rod 40 forward. The proper adjustment of the sliding terminal 57 by means of the binding post nut 59 will cause the ignition to be automatically cut off. It is, of course, understood that the terminal 58 may be so adjusted as to cut off the ignition without choking the engine. It will thus be seen that the mechanism may be adjusted or set so that the priming valve and ignition cut-off may be operated either separately or together as desired.

The system of control or stop lines shown clearly in Figs. 3 and 4 are regarded as very important and essential features of the invention. It is to be understood that the line 26 stops the motor only when the plow and tractor break connection, that is, should the break pin be sheared off; the stop line 19 only operates on contact with a stop wire 78 or the like; the wheel line 29 only as the steering wheel turns; the stall line 34 only when the drive wheels "dig in" when tractor is stationary and motor running with clutch on.

Attention is also called to the fact that the tractor carries all the weight of the guide bar. The point of suspension of the front end of shoe 3 is in line directly over the axis of the spindle pin which prevents raising or lowering in turns to right or left. This is absolutely essential in an automatic device where the guide shoe is all, (not just one end) carried by the tractor.

The point of suspension of the forward end of guide shoe 3 must always be located in a perpendicular line or axis which never varies its distance from the guide shoe in turns right or left.

Without further description it is thought that the features and advantages of the invention will be readily apparent to those skilled in the art, and it will of course be understood that changes in the form, proportion and minor details of construction may be resorted to, without departing from the spirit of the invention or its scope as claimed.

I claim:—

1. The combination with a tractor having the usual steering mechanism including front steering wheels having hubs, a furrow engaging guide bar mounted on one of said hubs, means for yieldably holding said guide bar engaged with the side wall of the furrow, means for limiting the movement of said bar to prevent its dropping below a predetermined point, and a connection between said bar and steering mechanism whereby the tractor wheels may be located either in or to one side of the furrow.

2. The combination with a tractor having steering mechanism; a substantially J-shaped guide bar connected at the free end of its long arm with the tractor, means connected with the other end of said guide bar and with the tractor to limit the vertical downward movement of the guide bar, and removable weights for varying the pressure of the guide bar on the surface over which the tractor is traveling.

3. A steering control for vehicles including a rotary steering wheel, a guiding device operatively connected with said wheel and adapted to engage guiding means over which the vehicle travels, means to yieldably hold said steering wheel in neutral position, and including a contractile spring anchored in respect to the axis of said wheel, a cam device on said wheel, and a flexible connection between the spring and the cam whereby on turning of the wheel in one direction said connection will be wound on the cam, the decreasing radius of the cam compensating for the increasing tension of the spring.

4. A steering control for vehicles including a steering wheel, a guiding device operatively connected with said wheel, and adapted to engage guiding means on the surface over which the wheel travels, means to hold the wheel yieldably in neutral position, said means including a contractile spring anchored in relation to the axis of the wheel, a spiral cam on said wheel, and a flexible connection between the spring and the outer portion of the cam whereby on turning of the wheel in one direction said connection will be wound on the cam, the increasing radius of the cam compensating for the increasing tension of the spring.

5. The combination with a tractor having a steering mechanism; a guide bar connected at one end with the tractor, flexible means connected with the other end of said guide bar and with the tractor to limit the vertical downward movement of the guide bar and permit it to move upwardly on encountering obstructions, and removable weights for varying the pressure of the guide bar on the surface over which the tractor is traveling.

Signed at Frankfort, in the county of Spink and State of S. Dak. this 8th day of Nov. A. D. 1927.

WILLIAM W. SWAN.